(12) United States Patent
Kismarton et al.

(10) Patent No.: US 8,360,362 B2
(45) Date of Patent: Jan. 29, 2013

(54) AIRCRAFT FLOOR AND METHOD OF ASSEMBLY

(75) Inventors: Max U. Kismarton, Renton, WA (US); Willard N. Westre, Bellevue, WA (US); Stuart M. Buchan, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 670 days.

(21) Appl. No.: 12/056,456

(22) Filed: Mar. 27, 2008

(65) Prior Publication Data

US 2008/0210820 A1    Sep. 4, 2008

Related U.S. Application Data

(63) Continuation-in-part of application No. 11/358,503, filed on Feb. 21, 2006.

(51) Int. Cl.
*B64C 1/00*   (2006.01)
*B64C 1/18*   (2006.01)

(52) U.S. Cl. ..................... 244/117 R; 244/119
(58) Field of Classification Search .............. 244/117 R, 244/119, 118.2
See application file for complete search history.

(56) References Cited

U.S. PATENT DOCUMENTS

| | | | |
|---|---|---|---|
| 4,271,975 A * | 6/1981 | Ketner et al. | 220/683 |
| 4,676,545 A * | 6/1987 | Bonfilio et al. | 296/193.04 |
| 5,240,543 A * | 8/1993 | Fetterhoff et al. | 156/293 |
| 5,806,797 A * | 9/1998 | Micale | 244/120 |
| 6,497,388 B1 | 12/2002 | Friend et al. | |
| 2004/0126537 A1* | 7/2004 | Jackson et al. | 428/118 |
| 2005/0211840 A1* | 9/2005 | Grether et al. | 244/119 |
| 2006/0214058 A1 | 9/2006 | Westre et al. | |
| 2006/0231681 A1* | 10/2006 | Huber et al. | 244/119 |
| 2007/0176048 A1* | 8/2007 | Huber et al. | 244/119 |

* cited by examiner

*Primary Examiner* — Philip J Bonzell
(74) *Attorney, Agent, or Firm* — Parsons Behle & Latimer

(57) ABSTRACT

The invention relates to aircraft floor assemblies and to methods for their assembly. In one embodiment, an aircraft comprises at least one fuselage section and at least one floor section. At least one system component is installed to the floor section prior to installation of the floor section in the fuselage of the aircraft. In another embodiment, a floor section adapted to be installed in an aircraft includes at least one system component installed to the floor section while it is outside of the aircraft. In yet another embodiment, a method is disclosed for assembling an aircraft. The method comprises installing at least one system component to a floor section, and installing the floor section into a fuselage section of the aircraft.

11 Claims, 12 Drawing Sheets

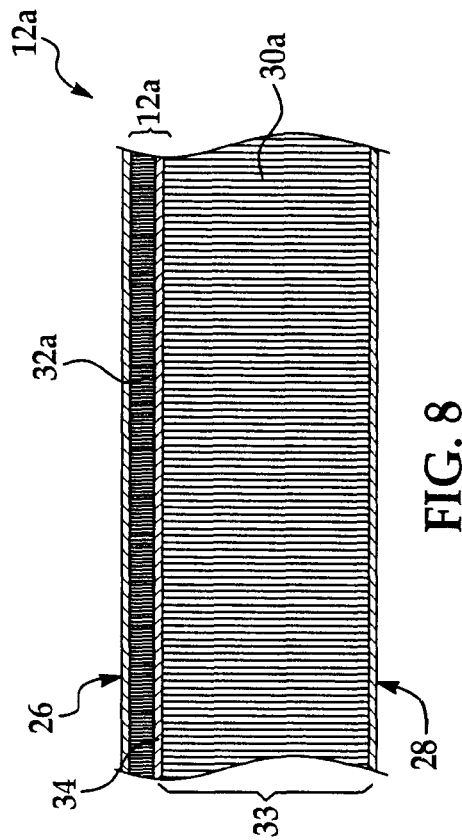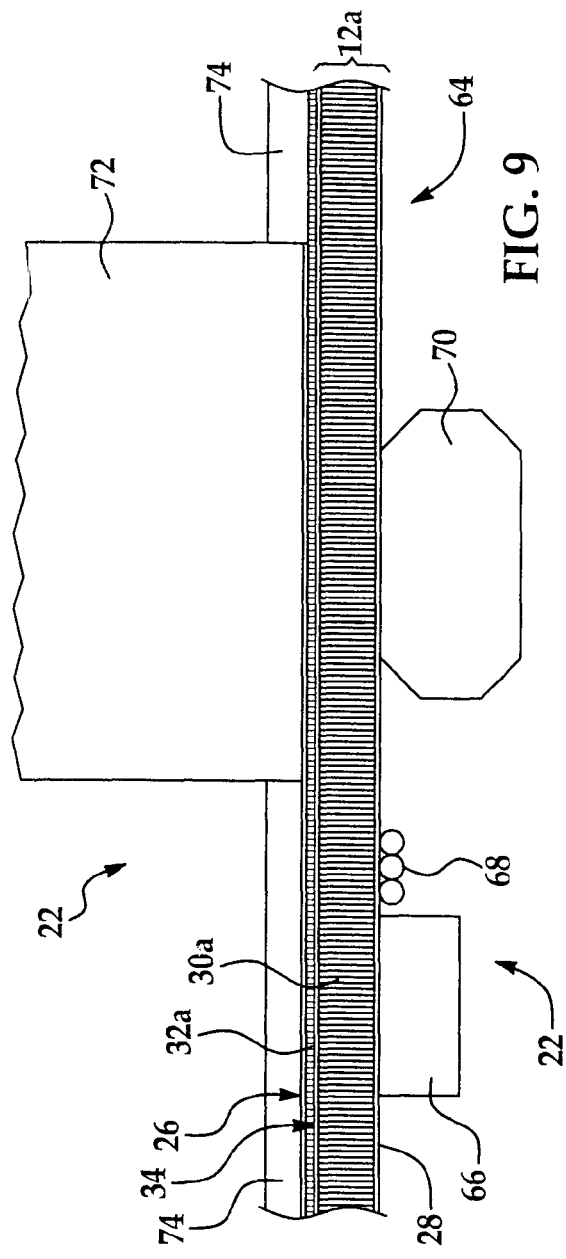

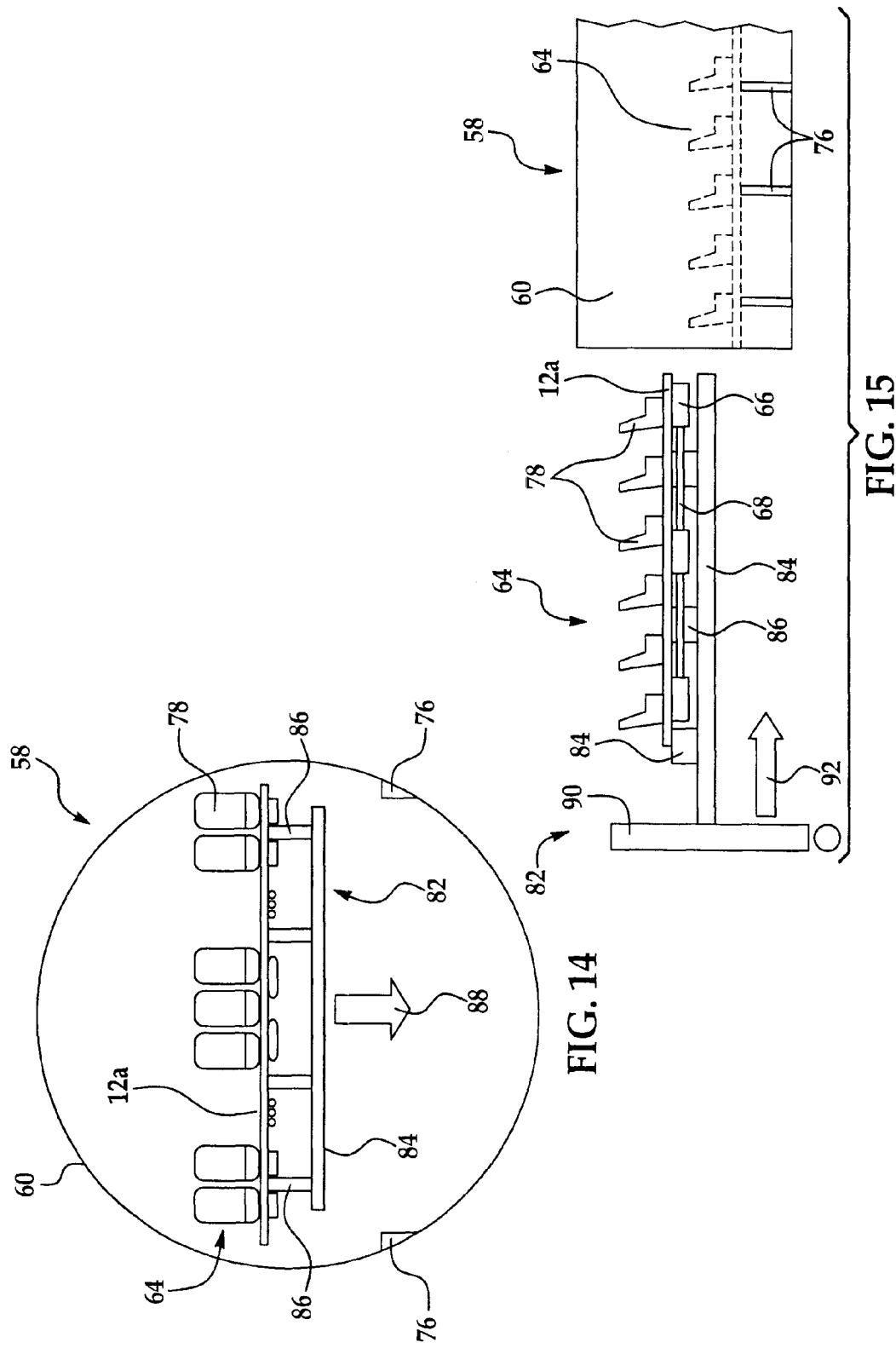

US 8,360,362 B2

AIRCRAFT FLOOR AND METHOD OF ASSEMBLY

CROSS REFERENCE TO RELATED APPLICATION

This application is a continuation-in-part of U.S. patent application Ser. No. 11/358,503 filed Feb. 21, 2006 and published as U.S. Patent Application Publication No. US 2007/0194175 A1 on Aug. 23, 2007, the entire contents of which are incorporated by reference herein.

TECHNICAL FIELD

The disclosed embodiments generally relate to manufacturing techniques and subassemblies used in the fabrication of aircraft, and deal more particularly with a self-supporting composite floor on which aircraft system components may be mounted or attached before the floor is installed in the aircraft.

BACKGROUND

Cabin floors for larger commercial and military aircraft typically comprise a number of individual, light weight panels that are assembled together while inside the aircraft. The panels are formed from composite material having a relatively low density core and may number in excess of 100 for a typical aircraft. Each panel has four edges that may be individually sealed to the edges of adjoining panels using sealing tape, as part of the assembly process. Because the panels use a low density core, they may have limited toughness and durability, and must be carefully handled during the assembly process in order to avoid deforming the face sheets, and particularly their edges. Additionally, each panel may require multiple fasteners to secure it to the framework in the aircraft, or to the adjoining panels.

The technique described above for forming a cabin floor is not only labor intensive, but requires a relatively large number of parts, and may also require rework of the panels during the installation process. Moreover, after the aircraft is placed in service, the sealing tape may need to be replaced from time-to-time, and/or individual panels may need to be repaired or replaced, for instance, when the cabin floor carpet is replaced or partially removed in order to service aircraft systems. Finally, a cabin floor of the type discussed may have less stand-alone structural strength than a monolithic, one-piece floor because it is formed from many individual panels.

Present aircraft floors also may make installation of certain aircraft system components more difficult because the floor is installed in the aircraft before installation of the system components. The floor may therefore obstruct areas of the aircraft such as, without limitation, cargo bays, where components such as electrical boxes, wiring, ducting, and other components, are commonly installed. Assembly personnel may be required to install these system components while inside the cargo bays, where space and clearances may be tight, due in part to a previously installed overhead cabin floor that includes supporting beams extending downward into the cargo area. Thus, the installation of the system components after the floor has been installed may be difficult, time consuming, labor intensive, require numerous parts, and may require mounting the components in areas that may be less than optimal for future service and/or maintenance of the components.

Accordingly, there is a need for an aircraft floor and related aircraft assembly method that overcomes one or more of the disadvantages and limitations mentioned above. There is also a need for a unitary aircraft floor that is self-supporting, in order to reduce or eliminate the need for underlying support beams.

SUMMARY

In accordance with one embodiment, a preassembled subassembly for installation in fuselage of an aircraft comprises: a monolithic floor panel section having a self-supporting span; and, at least one aircraft system component attached to the floor system, wherein the floor panel section possesses sufficient structural strength across its span to support the weight of the floor panel section and the attached system component. The floor panel section may include a structural honeycomb core and may span substantially the entire width of the fuselage. The honeycomb core may include a first, upper core, and a second, lower core that has a density less than that of the upper core. The floor panel section may include embedded mounting structure that allows the attachment of aircraft system components which are attached to the floor panel section before the subassembly is installed in the fuselage.

According to another disclosed embodiment, a subassembly is provided for installation into the fuselage of an aircraft comprising: at least one aircraft system component; a generally planar, monolithic composite floor section having a span extending across the fuselage; and, means for attaching the aircraft system component to the composite floor section. The floor section includes first and second structural cores providing the floor section with sufficient structural strength to support the weight of the floor section and the weight of the aircraft system component substantially across the entire span of the floor section. The floor section includes two honeycomb cores at different densities sandwiched between top and bottom skins.

According to still another embodiment, a floor assembly for an aircraft, comprises: a monolithic floor panel section having a bottom side substantially free of obstructions; at least one aircraft system component; and, attaching structure embedded in and running along a length of the floor panel section for attaching the system component to the bottom of the floor panel section in any of a plurality of locations along the length of the floor panel section. The attaching structure may include a tube running along a length of the floor panel, and a fastening member extending through at least a portion of the tube for attaching the aircraft system component to the floor panel section. The tube may include a plurality of through holes therein respectively representing a plurality of locations at which the aircraft system component may be attached.

In accordance with a disclosed method embodiment, assembling an aircraft comprises: forming a stand-alone floor panel section having a self-supporting span; preassembling a subassembly outside of the aircraft by attaching at least one aircraft system component to the floor panel section; moving the subassembly into the fuselage of the aircraft; installing the subassembly into the fuselage; and, using the structural strength of the floor panel section to support the floor panel section over its span and the weight of the aircraft system component. Forming the floor panel section may include laminating first and second structural honeycomb cores between the top layer and the bottom layer skins. Forming the subassembly may be performed at a work station outside of the fuselage. Installation of the subassembly into the fuselage may include orienting the floor panel section generally vertically within the fuselage and rotating the floor panel section to a substantially horizontal position within the fuselage. The method may further comprise embedding a mounting structure in the floor panel section which is used to mount the aircraft system components on the floor section.

The disclosed embodiments satisfy the need for an aircraft floor and a related aircraft assembly method that reduce assembly time and material cost. The disclosed embodiments further satisfy the need for a monolithic aircraft floor that spans substantially the entire width of the fuselage, thereby eliminating the need for joining multiple panels to span the fuselage. Additionally, the disclosed embodiments provide a monolithic aircraft floor that is self-supporting, which reduces or eliminates the need for supporting beams and allows system components to be attached to the floor before it is installed in the aircraft.

These and other features, aspects and advantages of the disclosed embodiments will become better understood with reference to the following drawings, description and claims.

BRIEF DESCRIPTION OF THE ILLUSTRATIONS

FIG. 8 is a cross section view of another embodiment of a composite floor section.

FIG. 9 is a sectional view showing aircraft system components having been mounted on the composite floor section shown in FIG. 8 prior to installation of the floor section in the aircraft.

FIG. 14 is a view similar to FIG. 12 but showing a lifting device used for moving the subassembly into the fuselage.

FIG. 15 is a side view of the subassembly being moved into the fuselage by the lifting device.

DETAILED DESCRIPTION

Figure 1:
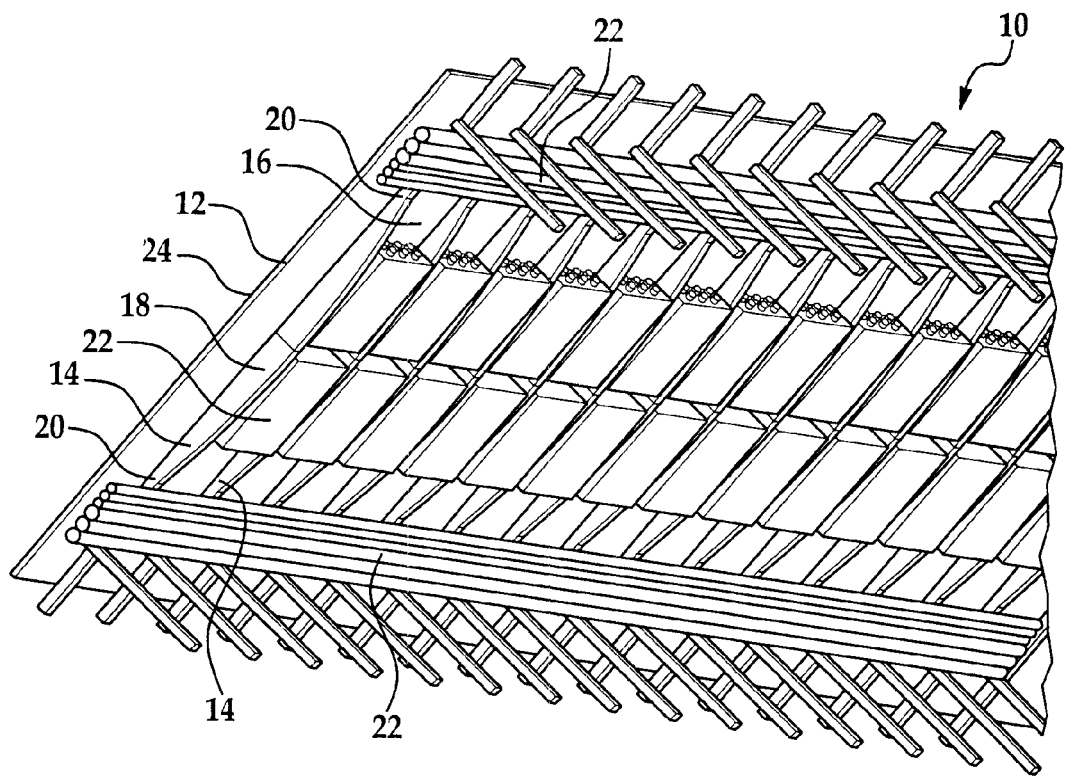
FIG. 1 is a perspective view of one embodiment of a floor section.

As shown in FIG. 1, in one embodiment a floor section 10 may be provided which is adapted to be installed into an aircraft (not shown). The floor section 10 may be an integrated one-piece section, or may comprise more than one piece, depending on the size and configuration of the aircraft. In one aircraft implementation for example, the floor section 10 may be, without limitation, 20 feet wide and 60 feet long. In other embodiments, the floor section 10 may be of any type, size, shape, orientation, and/or configuration. In one embodiment, the floor section 10 may include a floor 12, and integrated, spaced apart beams 14 extending over at least a portion of bottom portion 16 of floor section 10. Bottom portion 16 of floor section 10 is defined as the portion of floor section 10 below floor 12. The integrated spaced apart beams 14 may extend substantially perpendicular to the floor 12. The beams 14 may be thickest in their center portion 18 and may taper so that they are thinnest at their side portions 20, however, other beam geometries are possible, depending on the configuration of the aircraft. One or more system components 22 may be installed on a top section 15 and/or the bottom section 16 of the floor section 10. The system component 22 may comprise, for example, without limitation, one or more of a flight control, a seat, an instrument panel, an electronic box, a duct, and/or a wire, to name only a few possibilities.

In one embodiment, one or more system components 22 may be installed on, in or near a bottom portion 16 of the floor section 10 between two floor beams 14. For example, the electronic boxes, ducts, and wires may be installed in the bottom portion 16 of the floor section 10 between floor beams 14.

Figure 2:
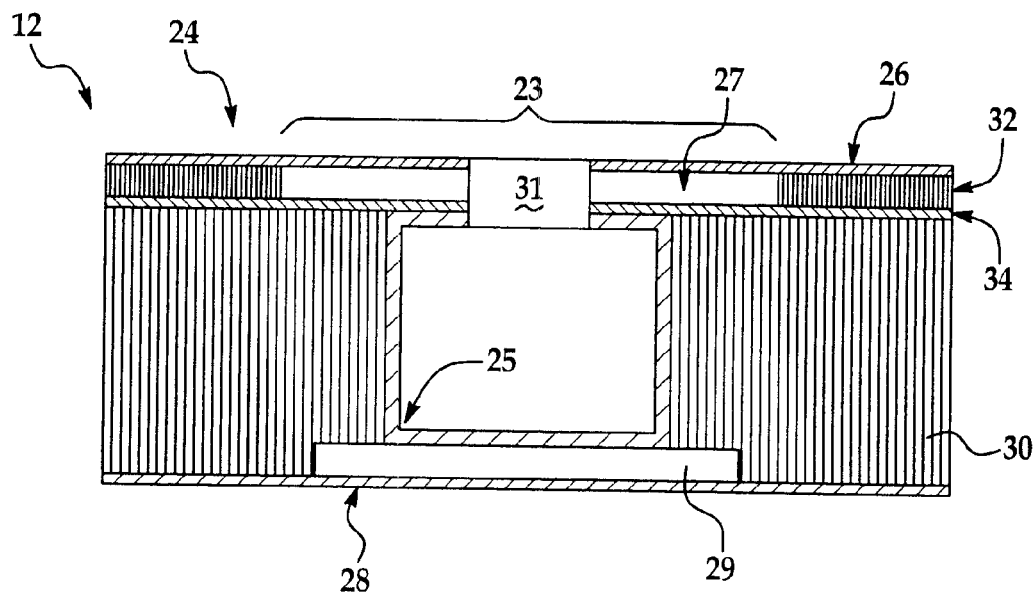
FIG. 2 is a cross-sectional view of an embodiment of a composite floor.

In another embodiment, one or more system components 22 may be installed on a top portion 24 of the floor section 10. Top portion 24 of floor section 10 is defined as the portion of floor section 10 above floor 12. For example, the flight controls and seats (not shown) may be attached to the top portion 24 of the floor section 10. As shown in FIG. 2, exemplary floor section 10 may include an attaching structure 23 that includes a tubular attachment tube 25, an optional top strap 27 and an optional bottom strap 29. The attaching structure 23 provides a structural base for which a plurality of holes 31 can be provided, such holes being sized and situated as to allow system components such as seats (not shown) or a galley (not shown) to be secured to the floor section 10.

According to the disclosed embodiments, the system components 22 may be installed on the floor section 10 while the floor section 10 is outside of the aircraft, i.e., before the floor section 10 is installed in the aircraft. In other embodiments, any number of system components 22 may be installed in any location, configuration, or orientation on any portion of the floor section 10. Preferably, numerous system components 22 are installed on and distributed throughout the floor section 10 in order to protect as many components 22 as possible.

In one embodiment, the floor 12 of the floor section 10 may comprise one or more of the integrated aircraft structural floors disclosed in U.S. patent application Ser. No. 11/086, 307, filed on Mar. 23, 2005, entitled "Integrated Aircraft Structural Floor", the entire disclosure of which is incorporated by reference herein. For instance, as depicted in FIG. 2, the floor 12 of the floor section 10 may comprise a composite sandwich that includes a top-layer skin 26, a bottom layer skin 28 disposed below the top-layer skin 26, and a first structural core 30 disposed between the top-layer skin 26 and the bottom layer skin 28. The first structural core 30 may be low-density, and a high-density second structural core 32 may be affixed to the low-density first structural core 30 via septum 34. The first and/or second structural cores, 30 and 32, may comprise honeycomb composite materials.

Figure 3:
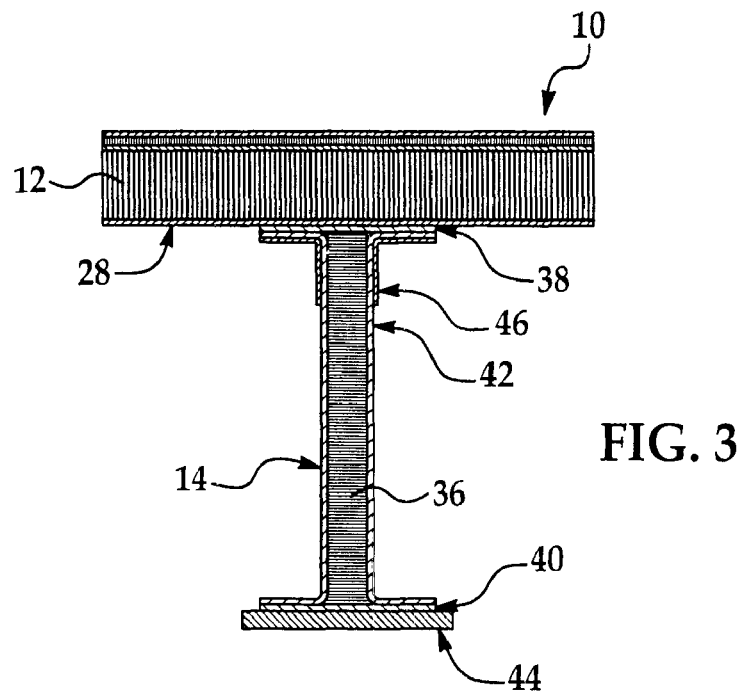
FIG. 3 is a cross-sectional view of an embodiment of a composite floor beam.

In one embodiment, the floor 12 of the floor section 10 may be made of any of the materials disclosed in U.S. patent application Ser. No. 11/086,307 mentioned above. As depicted in FIG. 3, the spaced apart beams 14 may be attached to the bottom layer skin 28 of the floor 12 of floor section 10, and the beams 14 may extend across a width of the floor section 10. Each beam 14 may comprise a central core 36, an upper cap 38, a lower cap 40, a left and right web 42, a lower reinforcing cap 44, and a left and right doubler 46. In other embodiments, the beams 14 may comprise any embodiment of the beams disclosed in U.S. patent application Ser. No. 11/086,307.

Figure 4:
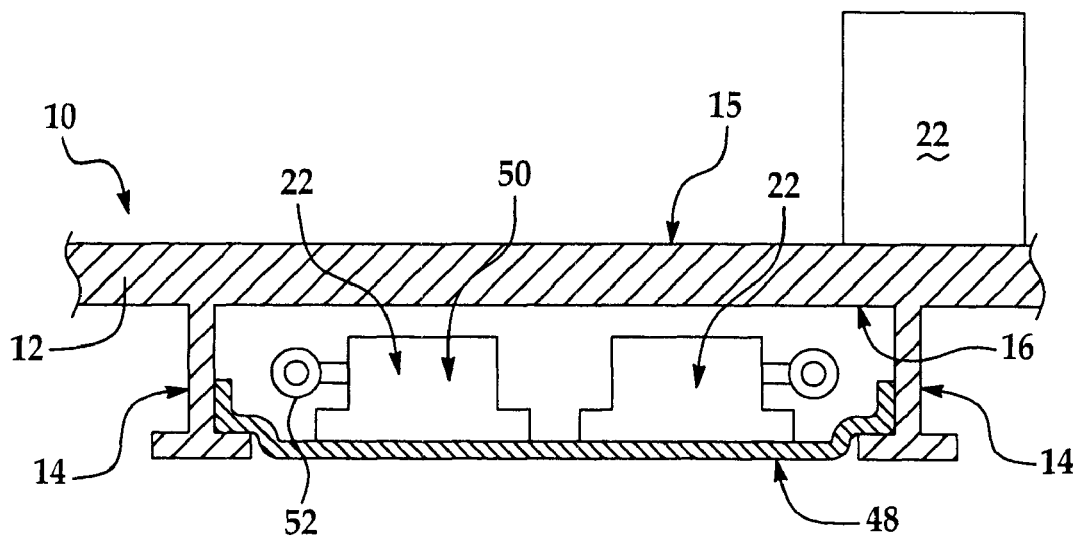
FIG. 4 is a partial cross-sectional view of one embodiment of a bottom portion of a floor section.

FIG. 4 depicts system components 22 disposed below floor 12 of floor section 10. As shown, the system components 22 may be disposed in the bottom portion 16 of the floor section 10 below floor 12, between beams 14, and above one or more doors 48. The system components 22 may be installed directly on door 48 or may be installed on the beams 14 or on another part of the floor section 10 such as the bottom portion 16. In other embodiments, the system components 22 may be installed on one or more members extending substantially perpendicular to the floor section 10. Installation of the system components 22 may be accomplished utilizing various mechanisms known in the art, such as, without limitation, bolts, brackets, snap-fits, clips, hinges, and/or adhesive. Door 48 may be attached between beams 14 using one or more hinges, brackets, bolts, or clips to allow access to the system components 22 from the bottom portion 16 of the floor section 10. In such manner, when the floor section 10 is installed on an aircraft a maintenance worker may access the system components from below the floor section 10. As shown, the system components 22 may comprise electrical boxes 50 and wires 52 running from the electrical boxes 50. In other embodiments, other system components 22 known in the art may be utilized.

Figure 7:
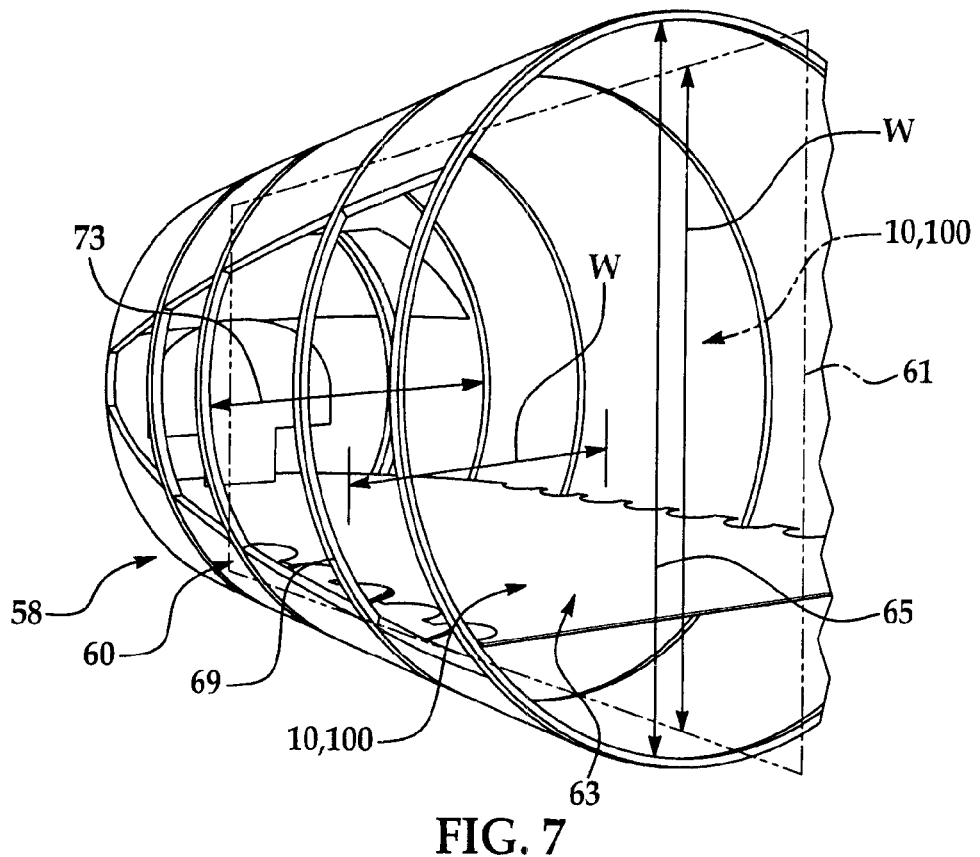
FIG. 7 is a partial perspective view showing one embodiment of a floor installed in the fuselage of an aircraft.

Referring to FIG. 7, in another embodiment, an aircraft 58 includes at least one fuselage section 60 and at least one floor section 10. In this example, the fuselage section 60 has a height 65 greater than a width 73 of the fuselage section 60 and greater than the width "W" of the floor section 10. The floor section 10 may be attached to the fuselage section 60 of the aircraft 58 utilizing any mechanism known in the art such as, without limitation, bolts, brackets, snap-fits, clips, hinges, and/or adhesive. The floor section 10 may comprise any of the embodiments of the floor section 10 disclosed herein. The floor section 10 may have at least one system component 22 installed to the floor section 10 prior to the installation of the floor section 10 into the fuselage section 60.

Figure 6:
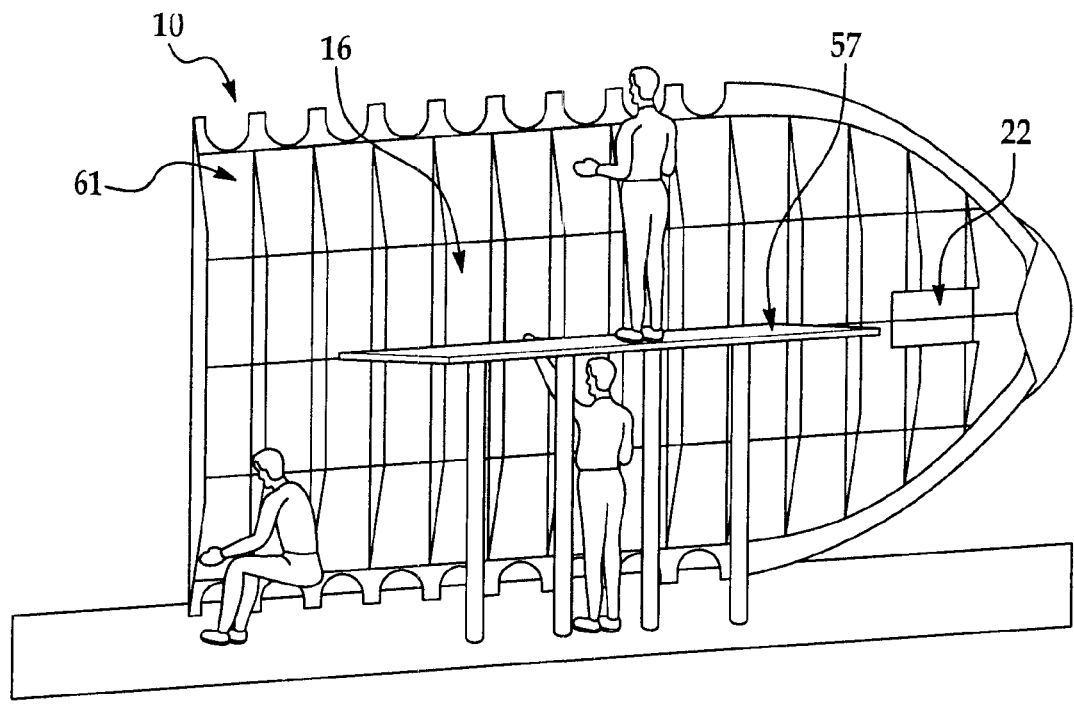
FIG. 6 is a front view showing one embodiment of system components being installed on a floor section using a workstation outside of the aircraft.

As shown in FIG. 6, the system component 22 may be installed on the floor section 10 while the floor section 10 is outside of the fuselage section 60 utilizing a work-station 57 located outside of the aircraft 58. The floor section 10 of the aircraft 58 may have been rotated into one or more positions while outside of the aircraft 58 in order to install the system component 22 on the floor section 10 while outside of the aircraft.

Referring again to FIG. 7, the floor section 10 may be installed into the fuselage section 60 by orienting the floor section 10 substantially vertically 61, moving the floor section 10 into the fuselage 60 through one end of the fuselage section 60, and then rotating the floor section 10 into a substantially horizontal position 63 within the fuselage section 60. As will be discussed in more detail below, the floor section 10 may be installed into the fuselage section 60 utilizing varying mechanisms (not shown). The aircraft 58 may include three floor sections 10, which may be distributed throughout forward, middle, and aft portions of the aircraft 58. In other embodiments, any number of floor sections 10 may be utilized in any size, configuration, location, and/or orientation.

Figure 5:
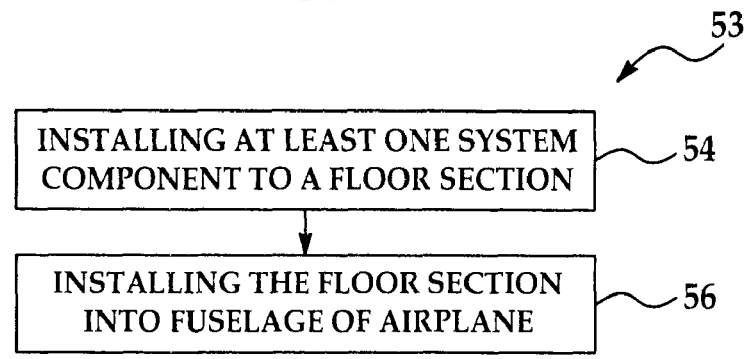
FIG. 5 depicts one embodiment of a method for assembling an aircraft.

FIG. 5 depicts one embodiment 53 of a method for assembling an aircraft. In step 54, at least one system component 22 may be installed on a floor section 10. The system component 22 may be installed on a bottom portion of the floor section 10 between two floor beams 14. A plurality of system components 22 may be installed throughout the floor section 10. Equipment, wiring, and electronic boxes may be installed on the floor section 10, in a sequential order. In other embodiments, any order and types of system components 22 may be utilized. The system components 22 and floor section 10 may comprise any of the embodiments disclosed herein.

Referring again to FIG. 6, as previously noted, one or more workstations 57 outside of the aircraft may be utilized to install the system components 22 on either or both the top section 15 (see FIG. 4) or the bottom section 16 of the floor section 10. FIG. 6 depicts the workstation 57 positioned next to the bottom section 16 of the floor section 10, however, it may also be positioned next to the top section 15 of the floor section 10 in those cases where it is desired to install a system component 22 such as a seat (not shown) on the top section 15. It is also possible to place workstations 57 next to both the top and bottom sections 15, 16 of the floor section 10 so that system components 22 may be installed simultaneously on the top and bottom of the floor section 10.

Installing the system components 22 on the floor section 10 outside of the aircraft 58 may allow the floor section 10 to be rotated into one or more positions while outside of the aircraft 58 to make it less difficult to install the system components 22. For instance, while the floor section 10 is located outside of the aircraft 58, the floor section 10 may be rotated into a substantially horizontal position (not shown) to allow attachment of the large equipment, such as the flight controls and seats, on the floor section 10. The floor section 10 may then be rotated into a substantially vertical position 61 to allow assembly personnel to connect electronic boxes and wiring to other systems in the aircraft 58. In other embodiments, any number of mechanisms and configurations may be utilized.

In step 56 of the method embodiments depicted in FIG. 5, the floor section 10 may be installed into a fuselage section 60 of the aircraft 58. As previously noted, in some aircraft configurations, such as that shown in FIG. 7, the height 65 of the fuselage section 60 may be greater than the fuselage width 73, which in turn may be only marginally greater than the width "W" of the floor section 10. In this case, in order to facilitate installation of the floor section 10, the floor section 10 may be installed into the fuselage section 60 of the aircraft 58 by orienting the floor section 10 substantially vertically 61 within the fuselage section 60 and then rotating the floor section 10 into the substantially horizontal position 63 within the fuselage section 60 before lowering the floor section 10 onto frame supports (not shown). As will be discussed below however, in other aircraft configurations, the floor section 10 can be oriented substantially horizontally as it is transported into and through the fuselage section 60 during the installation process.

The floor section 10 may be attached to the fuselage section 60 using any of various mechanisms, as previously mentioned. Multiple floor sections 10 or a single floor section 10 may be installed into the fuselage section 60. The step of installing the system components 22 on the floor section 10 may occur prior to the step of installing the floor section 10 into a fuselage section 60 of the aircraft. In applications where several fuselage sections 60 are joined together to form the aircraft 58, one or more of the floor sections 10 may be installed in each of the fuselage sections 60 before the fuselage sections 60 are joined together. Alternatively, the floor sections 10 may be installed after one or more of the fuselage sections 60 have been joined together.

Attention is now directed to FIGS. 8 and 9 which illustrate a monolithic, stand-alone, self-supporting floor panel section 12a formed of composite materials, generally similar to the composite floor panel section 12 previously described. As used herein, "stand-alone", "self-supporting" and "self-supporting span" may refer to the ability of the floor panel section 12a to support a load without the need for floor beams (not shown), or to support a load using a reduced number of floor beams or similar supports, substantially across the entire span or width W of the fuselage section 60 (see FIG. 7). "Stand-alone" and "self-supporting" may also refer to the ability of the floor section 12a to be fabricated outside of the aircraft and subsequently transported to and installed in the fuselage section 60 as a single unit that may span substantially the entire width of the fuselage section 60.

In the case of the illustrated application, the load that the floor panel section 12a is required to carry comprises the weight of the floor panel section 12a, along with the weight of any aircraft system components 22 that may be preinstalled on the floor panel 12a and the weight of additional loads placed on the floor panel 12a during normal service use of the aircraft. The degree to which the floor panel section 12a may be self-supporting across its width W may depend on the particular materials and dimensional details of the floor panel section 12a, and particularly the dimension of the width W.

In some cases, the span (width) of the self-supporting floor panel section 12a may be such that only a short, central section of the floor panel 12a may require underlying support to resist bending, deflection, torsion and/or other floor loading. In other cases, it may be possible to support the floor panel sections 12a with a fewer number of the beams, due to the fact that the floor panel section 12a is largely self-supporting. In still other cases, as described above, the floor section 12a may be self-supporting across its entire width W, thereby eliminating the need for any underlying support beams. In any event, the floor section 12a possesses sufficient structural strength to allow it to be fabricated as a single monolithic unit having length and width dimensions such that only a small number e.g. 1 to 3, of floor panel sections 12a may be required to form a floor of a relatively large commercial or military aircraft, in contrast to prior floor constructions requiring a large number of floor panels joined together in a quilt-like arrangement, in an assembly process performed inside the aircraft.

The floor panel section 12a broadly includes a top layer skin 26 and a bottom skin layer 28 between which there is sandwiched a first structural honeycomb core 30a and a second structural honeycomb core 32a separated by a septum 34. The first structural core 30a is disposed between the bottom layer skin 28 and the septum 34, while the second structural core 32a is disposed above the first structural core 30a, between the septum 34 and the top layer skin 26. The first structural core 30a may be formed of a suitable honeycomb material and has a density lower than that of the second structural core 32a. The second structural core 32a may also be formed of a lightweight honeycomb material possessing a density higher than that of the first structural core 30a.

The top-layer skin 26 and bottom-layer skin 28 may comprise composite laminate sheets composed of alternate layers of titanium foil and carbon-fiber reinforced plastic (a CFRP sheet which is a material often referred to those in the art as simply "Graphite"), and/or a titanium-CFRP laminate. However, in other embodiments the top-layer skin 26 and bottom-layer skin 28 may be composed of any number of materials including any number of known or later-developed multilayer laminates, titanium foils, foils made of other metals, fiberglass, fiberglass laminates, Nomex®, Kevlar®, CFRP sheets, thermoplastic CFRP sheets, thermoplastic resin, or any other materials that may be found advantageous or desirable. The top layer skin 26 and/or the bottom layer skin 28 may include stitch reinforcing. The top-layer skin 26 may have a thickness in the range of approximately 0.03 inches to 0.08 inches, while the bottom-layer skin 28 may have a thickness in the range of approximately 0.02 to 0.08 inches. In other embodiments, the size, configuration, orientation, type, and material of the top and bottom layer skins 26 and 28 may vary.

The low-density first structural core 30a may comprise a honeycomb structured material, Nomex®, or Kevlar®, and may have a thickness 33 of approximately 0.4 inches thick. The low-density first structural core 30a may have a density of about two pounds per cubic foot to three pounds per cubic foot. In other embodiments, the low-density first structural core 30a may be made of varying materials, of varying densities, of varying sizes, configurations, and/or orientations. Similarly, the high-density second structural core 32a may comprise a honeycomb structured material, Kevlar®, or a metal, and may have a thickness 27 of approximately 0.1 inches thick. The high-density second structural core 32a may have a density in a range of approximately three pounds per cubic foot to 10 pounds per cubic foot.

In other embodiments, the high-density second structural core 32a may be made of varying materials, of varying densities, of varying sizes, configurations, and/or orientations. In some embodiments, the density of the second structural core 32a may be approximately 3 to 5 times greater than the density of the first structural core 30a. While the density figures above may be well suited for most commercial aircraft flooring designs, it should be appreciated that the particular densities can vary from application to application. It should also be appreciated that densities may vary as new honeycomb materials are developed. Accordingly, the terms "low-density core" and "high-density core" may be viewed relative to one another as opposed to as being defined as within predefined density ranges.

As honeycomb composite materials are well known in the art, compiling a complete list of viable materials and combinations of material useable for the disclosed integrated floors may be impractical. However, materials of interest may include a range of metal composites, such as titanium and aluminum, ceramic composites, Nomex® composites, Kevlar® composites and so on, with overall density being a factor of the materials used, the thickness of the materials used, the type and amount of resin used, cell size and so on. The resins used may be any known or later developed resin viable for honeycomb composites.

The septum 34 may comprise a structural layer, such as a CFRP layer, sandwiched between two adhesive materials. However, in various embodiments, the core material of the septum 34 can vary to include any number of materials, such as titanium or other metals, CFRP, a titanium-CFRP laminate, a titanium foil sheet, a titanium-CFRP laminate, a fiberglass laminate, a CFRP reinforced sheet, a thermoplastic sheet, a thermoplastic resin, and/or a variety of other laminates and so on as may be found advantageous or otherwise desirable. The septum 34 may have a thickness in the range of approximately 0.005 inches to 0.03 inches. In other embodiments, the size, configuration, orientation, type, and material of the septum 34 may vary.

The floor panel section 12a described above may have a structural strength that is sufficient to allow it to be fabricated while outside the aircraft 58 and then handled and transported as a single stand-alone unit or as part of a subassembly, to the aircraft 58 where it is installed within the fuselage 60. Moreover, the floor panel section 12a may also have a structural strength that is sufficient to support one or more system components 22 while the floor section 12a is outside the aircraft 58, thus permitting the floor section 12a and components 22 to be preassembled as a subassembly outside the aircraft 58. Finally, the floor panel section 12a is relatively tough and is not readily prone to damage during transport, installation or service because the lower density core 30a is protectively covered by the higher density core 32a.

Referring now particularly to FIG. 9, a preassembled subassembly 64 comprises a self-supporting floor panel section 12a having one or more aircraft system components 22 attached or mounted thereon. In this example, the aircraft system components 22 may comprise for example, without limitation, an electrical box 66, wiring 68, an air duct 70, a cabin panel 72 and carpeting 74. Also, as shown in FIGS. 10-13, seats 78 may also be preinstalled on the floor section panel 12a. As previously indicated, the aircraft system components 66-74 may be mounted or attached to the floor panel section 12a outside of the aircraft 58, before the subassembly 64 is moved into the fuselage 60.

The floor panel section 12a possesses at least enough structural strength to carry the weight of the aircraft system components 66-72 as they are being attached to the floor panel section 12a, and while the subassembly 64 is being transported into the fuselage 60 for final placement. Notably, because the floor panel section 12a may be self-supporting across substantially its entire span, the system components 22 may be attached at any convenient location on the bottom of the floor section 12a, since beams 14 (see FIGS. 1, 3 and 4) are not required to support the floor section 12a, and thus substantially the entire bottom side of the floor section 12a may be free of obstructions, i.e. floor beams, that may restrict the placement of the system components 22.

Figure 10:
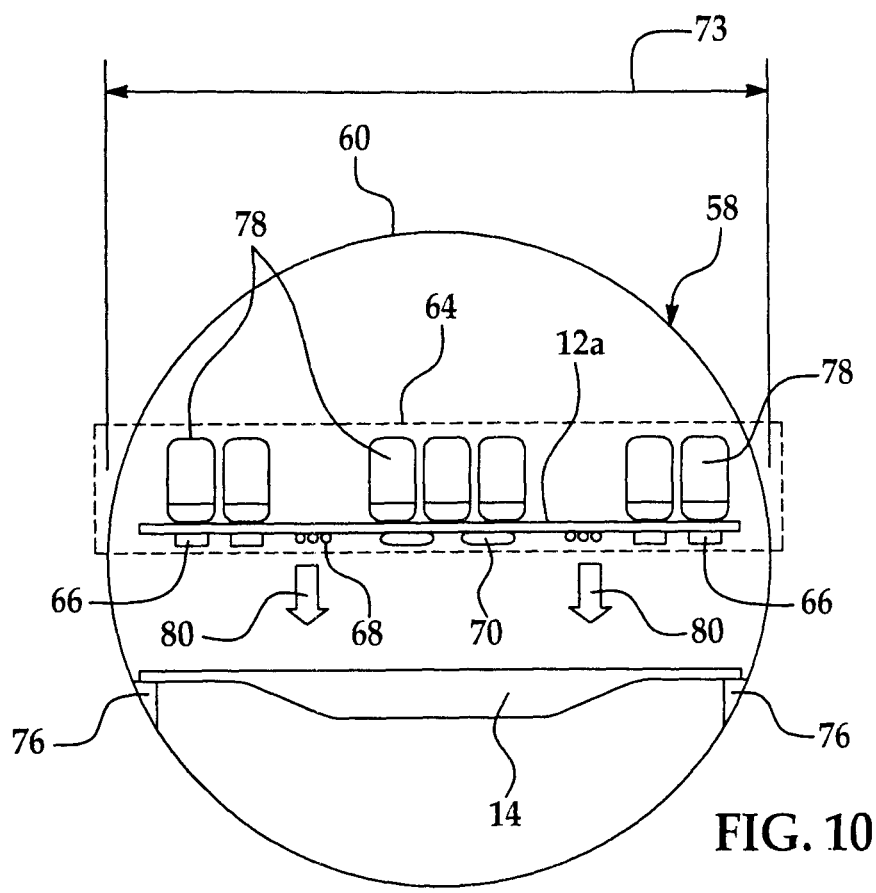
FIG. 10 is a schematic, cross sectional view of an aircraft fuselage, showing a subassembly being installed on support beams.
Figure 11:
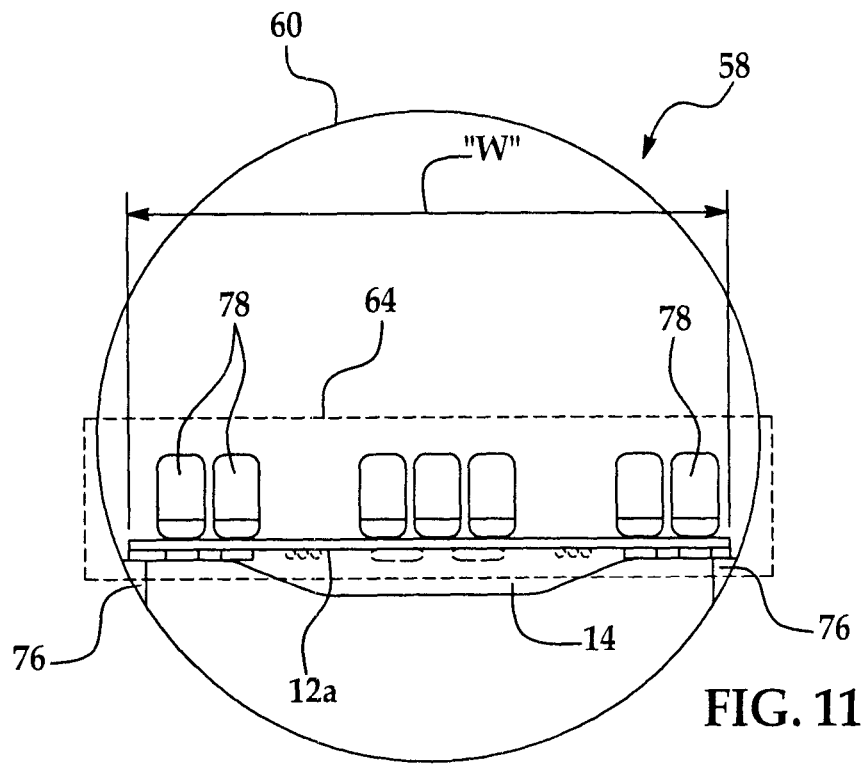
FIG. 11 is a view similar to FIG. 10, but showing the subassembly in its final, installed position on the support beams.

FIGS. 10 and 11 illustrate an aircraft fuselage 60 having a width 73 greater than the width "W" of the subassembly 64. Any of various mechanisms (not shown) may be used to transport the subassembly 64 in a substantially horizontal position into the fuselage 60 until it is positioned immediately above the structure to which it is to be attached. In this example, a plurality of transverse beams 14 secured to supports 76 on the fuselage 60 may be employed to support the weight of the subassembly 64. The transport mechanism (not shown) moves the subassembly 64 downwardly in the direction of the arrows 80 until the floor panel section 12a rests on the beams 14, to which it may then be secured, and shown in FIG. 11.

Figure 12:
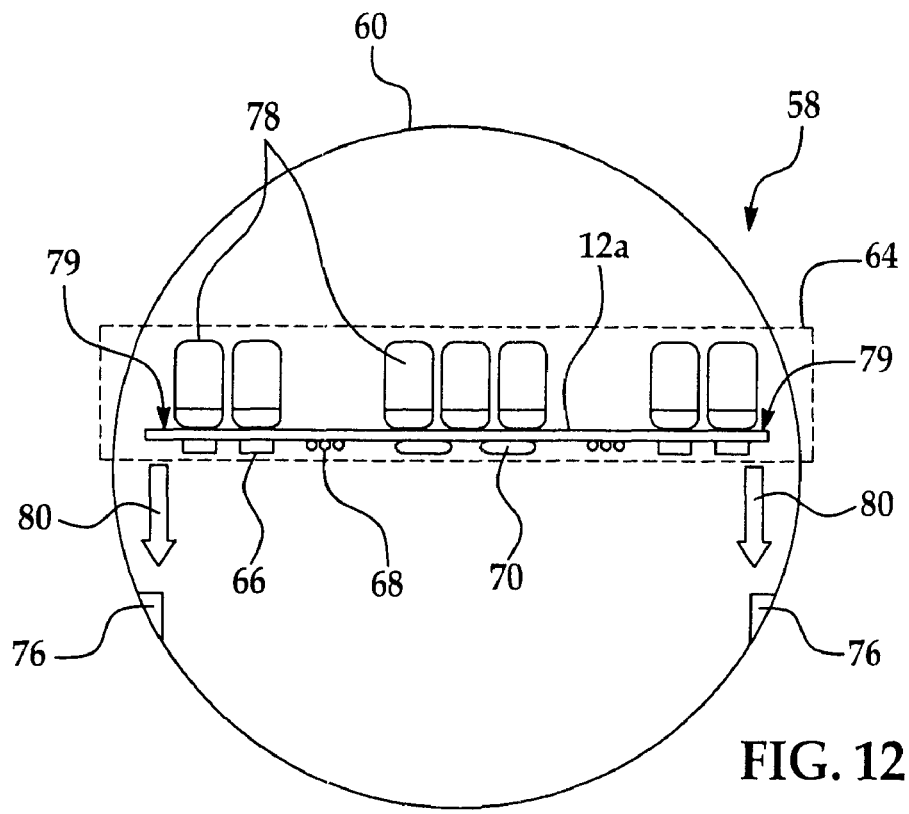
FIG. 12, is a view similar to FIG. 10, but showing the subassembly being installed in a fuselage but without the support beams.
Figure 13:
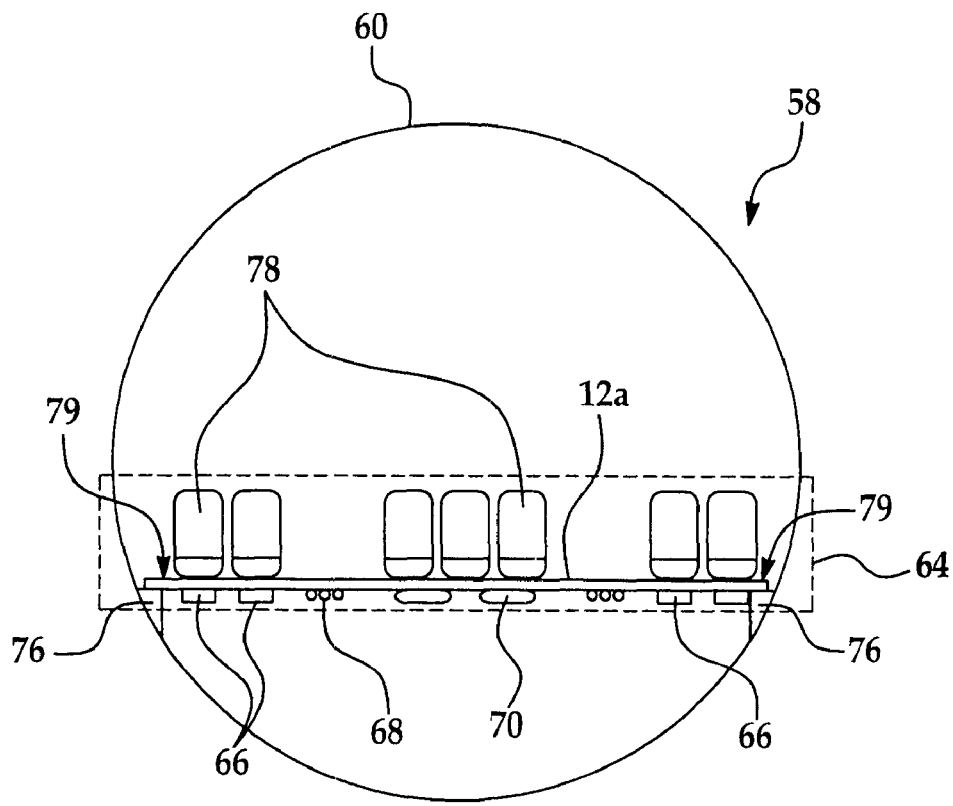
FIG. 13 is a view similar to FIG. 12, but showing the subassembly in its final, installed position.

Referring now to FIGS. 12 and 13, as previously discussed, the floor panel section 12a may possess sufficient structural strength to be self-supporting across substantially its entire span (width). Thus, in this example, the subassembly 64 may be moved into the fuselage 60 and positioned such that the outer edges 79 of the floor panel section 12a are disposed immediately above the fuselage supports 76. The subassembly 64 may then be lowered in the direction of the arrows 80 until edges 79 contact and are supported by the fuselage support 76, to which they may then be permanently attached. As shown in FIGS. 12 and 13, the floor panel section 12a may eliminate the need for supporting beams, similar to beams 14 shown in FIGS. 10 and 11.

FIGS. 14 and 15 diagrammatically illustrate the use of a simple transport mechanism 82 that may be used to lift and transport the subassembly 64 from an assembly work station 57 (FIG. 6) to the fuselage 60. The transport mechanism 82 may include a frame 84 having spaced apart, upstanding legs 86 that contact and support the bottom side of the floor panel section 12a. The frame 84 may be cantilevered on a wheeled vehicle 90. The vehicle 90 may be used to transport the subassembly 64 from the assembly work station 57 to the aircraft 58 where it moves the subassembly 64 through one end of the fuselage 60 and places it in a desired position on the fuselage supports 76. As previously discussed, depending on the size, configuration and the number of fuselage sections 60 of the particular aircraft 58, the subassembly 64 may be installed either before or after the fuselage sections 60 are joined together.

Figure 16:
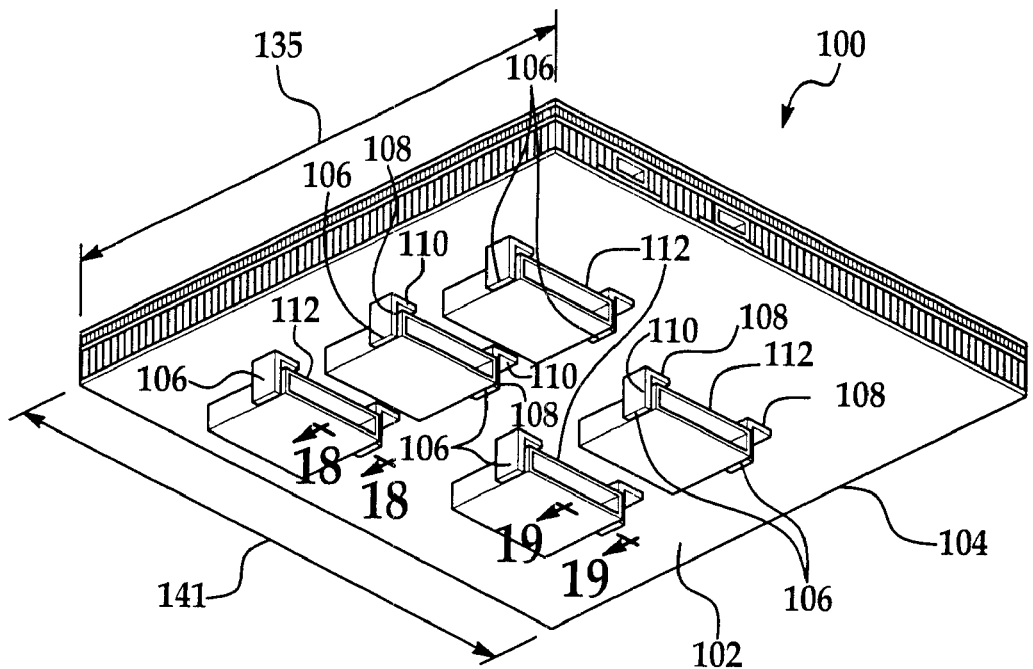
FIG. 16 shows a bottom perspective view of another embodiment of an integrated floor section.
Figure 17:
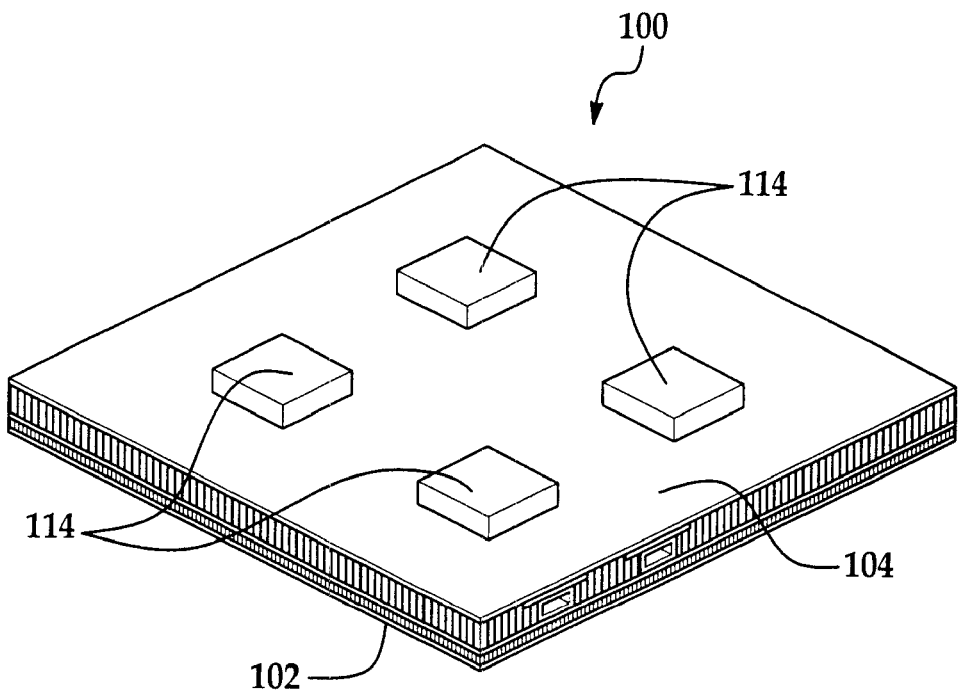
FIG. 17 is a top perspective view of the floor section of FIG. 16.

FIG. 16 shows a bottom perspective view of another embodiment of an integrated floor section 100 which may be made formed of composite, lightweight materials and may be adapted to be installed into an aircraft 58. FIG. 17 is a top perspective view of the floor section 100 of FIG. 16. As shown in FIGS. 16 and 17, the floor section 100 may comprise a monolithic, integrated one-piece section having a bottom portion 102 and a top portion 104. The floor section 100 may be rectangular, and in a typical aircraft application for example, may be least 20 feet wide, and 60 feet long. In other embodiments, the floor section 100 may be of any type, size, shape, orientation, and/or configuration.

As shown in FIG. 16, a plurality of brackets 106 may be attached to the bottom portion 102 of floor section 100. The brackets 106 may be lightweight and L-shaped. Each bracket 106 may have a floor attachment portion 108 attached to and extending substantially parallel to the floor section 100. The floor attachment portion 108 of each bracket 106 may only extend over a small portion of the floor section 100. Each bracket 106 may also have a system attachment portion 110 extending substantially perpendicularly relative to the floor section 100. The system attachment portion 110 of each bracket 106 may be attached to one or more system components 112 such as an electronic box, an electrical system, a control system, a lighting system, an entertainment system, a cable, a housing, a duct, a wire, and/or another type of system component. In other embodiments, the floor section 100, the brackets 106, and/or the system components 112 may be of any shape, size, configuration, orientation, type, and/or number.

It is important to note that floor beams similar to floor beams 14 shown in FIGS. 1, 3 and 4, may not be required to support the floor section 100, because the floor section 100 is constructed such that is largely or entirely self-supporting across its width W. Moreover, in those applications where higher floor loading may be present, the light weight brackets 106 which extend across short portions of the floor section 100 in combination with rigid system components 112 mounted between the brackets 106 may provide the floor section 100 with sufficient additional stiffness and rigidity such that floor beams may be unnecessary. The use of brackets 106 instead of floor beams to attach the system components 112 is made possible by the novel structure and materials of the floor section 100, discussed herein.

As shown in FIG. 17, a plurality of system components 114 may also be attached to a top portion 104 of the floor section 100. The attached system components 114 may comprise one or more of seats, control panels, carpeting, ducts, electrical systems, electrical boxes, control systems, lighting systems, entertainment systems, seat tracks, cables, housings, wires, and/or other types of system components.

The system components 112 and 114 of FIGS. 16 and 17 may be installed on the floor section 100 while the floor section 100 is outside of an aircraft. In other embodiments, any number of system components 112 and 114 may be installed in any location, configuration, or orientation on any portion of the floor section 100. Preferably, a multitude of system components 112 and 114 are distributed throughout the floor section 100 to protect as many components 112 and 114 as possible in the event of any damage that might occur in an area of the aircraft.

Figure 18:
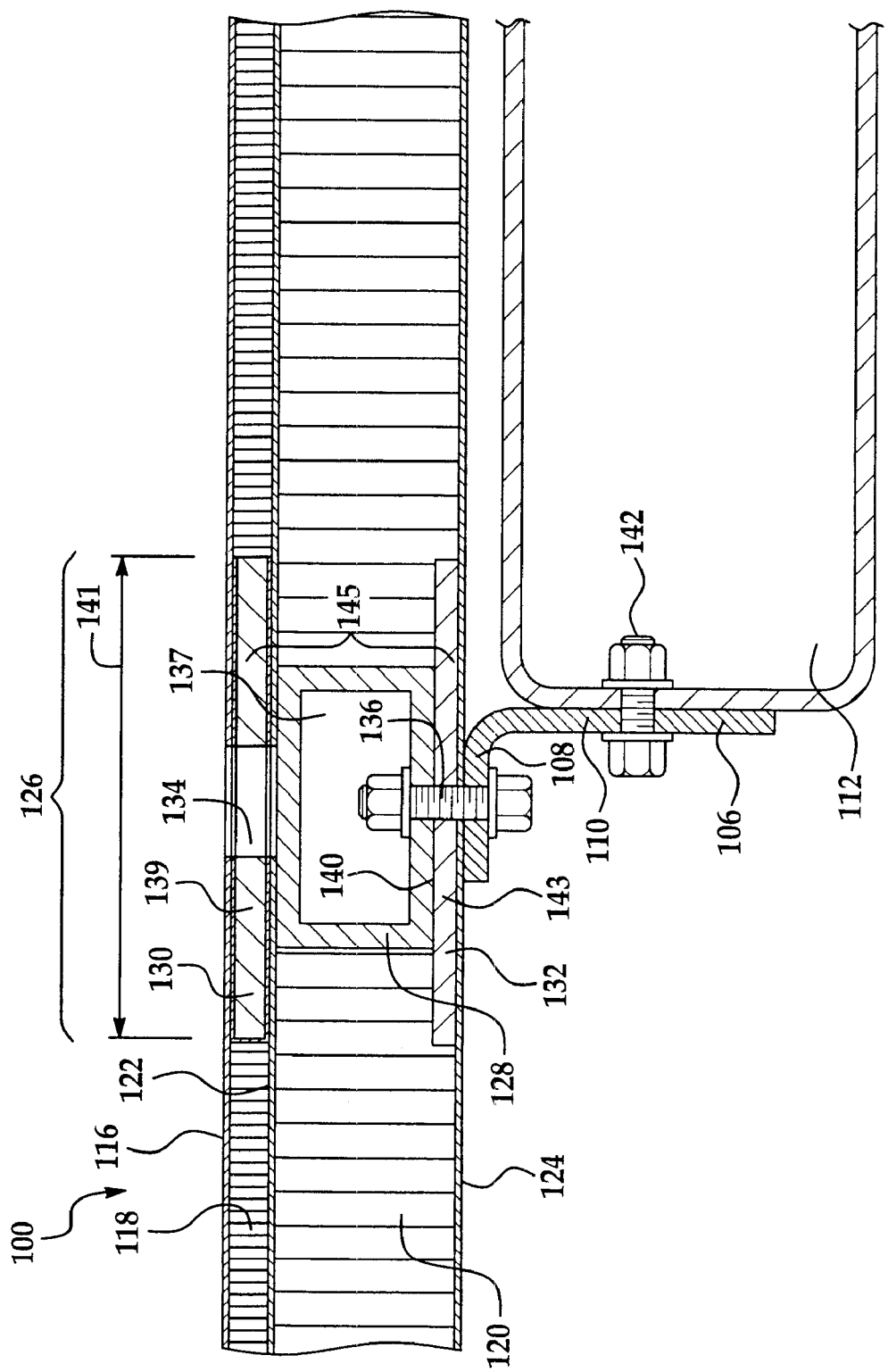
FIG. 18 is a partial cross-sectional view taken through line 18-18 of the floor section of FIG. 16.

FIG. 18 depicts a partial cross-sectional view through line 18-18 of the floor section 100 of FIG. 16. As shown in FIG. 18, a portion of the floor section 100 may comprise a top-layer skin 116 (a skin being a type of covering, or skin), a high-density first structural core 118 disposed directly beneath the top-layer skin 116, a low-density second structural core 120 affixed to the high-density first structural core 118 via a septum 122 and a bottom-layer skin 124.

An attaching structure 126 may be disposed in the portion of the floor section 100 shown in FIG. 18. The attaching structure 126 may be embedded within and run along an entire length 135 (shown in FIG. 16) of the floor section 100 for attaching one or more system components 112 to the floor section 100. The attaching structure 126 may displace a segment 145 of the first and second structural cores 118 and 120. The attaching structure 126 may include a hollow tubular attachment tube 128, a top plank 130 (also referred to as a first plank 130), and a bottom plank 132 (also referred to as a second plank 132).

The hollow tubular attachment tube 128 may displace a segment 137 of the second structural core 120 running along a length 135 (shown in FIG. 16) of the floor section 100. The top plank 130 may be disposed within a segment 139 of the high density first structural core 118, may be disposed above the hollow tube 128 and below the top-layer skin 116, may have a width W greater than that of the hollow tube 128, and may run along a length 135 (shown in FIG. 16) of the floor section 100. The bottom plank 132 may be disposed within a segment 143 of the low density second structural core 120, may be located below the hollow tube 128 and above the bottom-layer skin 124, and may run along a length 135 (shown in FIG. 16) of the floor section 100.

The attaching structure 126 may provide a structural base for which a plurality of holes 134 may be provided, such holes 134 being sized and situated as to allow system components 112 and/or 114 to be secured to the floor section 100. Because the attaching structure 126 runs along a length of the floor section 100, the system components 112 may be mounted at any of a plurality of locations along the length of the floor section 100. In other words, the mounting structure 126 provides a plurality of choices of mounting locations for the system components 112.

The composite portions of the floor section 100 may be similar to those in the floor panel section 10 previously described in connection with FIGS. 1-15. Specifically, the top-layer skin 116, bottom-layer skin 124, low density second structural core 120, high density core first structural 118 and septum 122 may be similar in size and material composition to top-layer skin 26, bottom-layer skin 28, low density second structural core 30a, high density first structural core 32a and septum 34 shown in FIG. 8.

The attachment tube 128 may comprise a rectangular hollow tube made of titanium. However, it should be appreciated that the composition and shape of the attachment tube 128 may vary from application to application as may be found advantageous or otherwise usable. For example, in various embodiments, an aluminum tube of greater thickness may be preferred, or a carbon-fiber matrix might be desirable.

The planks 130 and 132 may be made of BMS 8-276 composite (a carbon-fiber epoxy prepreg composite having a 350 degree cure temperature made by Toray, Inc). However, the particular materials used may vary to include any number of materials, such as titanium or other metals, CFRP, a titanium-CFRP laminate, a variety of other laminates and so on as may be found advantageous or otherwise desirable.

As shown in FIG. 18, in areas of the floor section 100 close to an attaching structure 126, the brackets 106 may be attached to the floor section 100 by a fastening member 136 which is extended through a drilled hole 138 running through the floor attachment portion 108 of the bracket 106, the bottom layer skin 124, the bottom plank 132, and through a bottom surface 140 of the hollow tube 128. The fastening member 136 may comprise any type of fastening member such as a bolt, a nut, a snap-member, a tie, and/or any other type of fastening member known in the art. One or more system components 112 may be attached to the system attachment portion 110 of each bracket 106 by using another fastening member 142 such as a bolt, a nut, a snap-member, a tie, adhesive, and/or any other type of fastening member known in the art. In such manner, system components 112 may be attached to the floor section 100 in areas close to an attaching structure 126 without the use of floor beams in the floor section 100 thereby saving cost and weight. The brackets 106 and system components 112 may be attached to the floor section 100 while the floor section 100 is located outside of an aircraft, and the integrated floor section 100 with the attached brackets 106 and system components 112 may then be installed into an aircraft.

Figure 19:
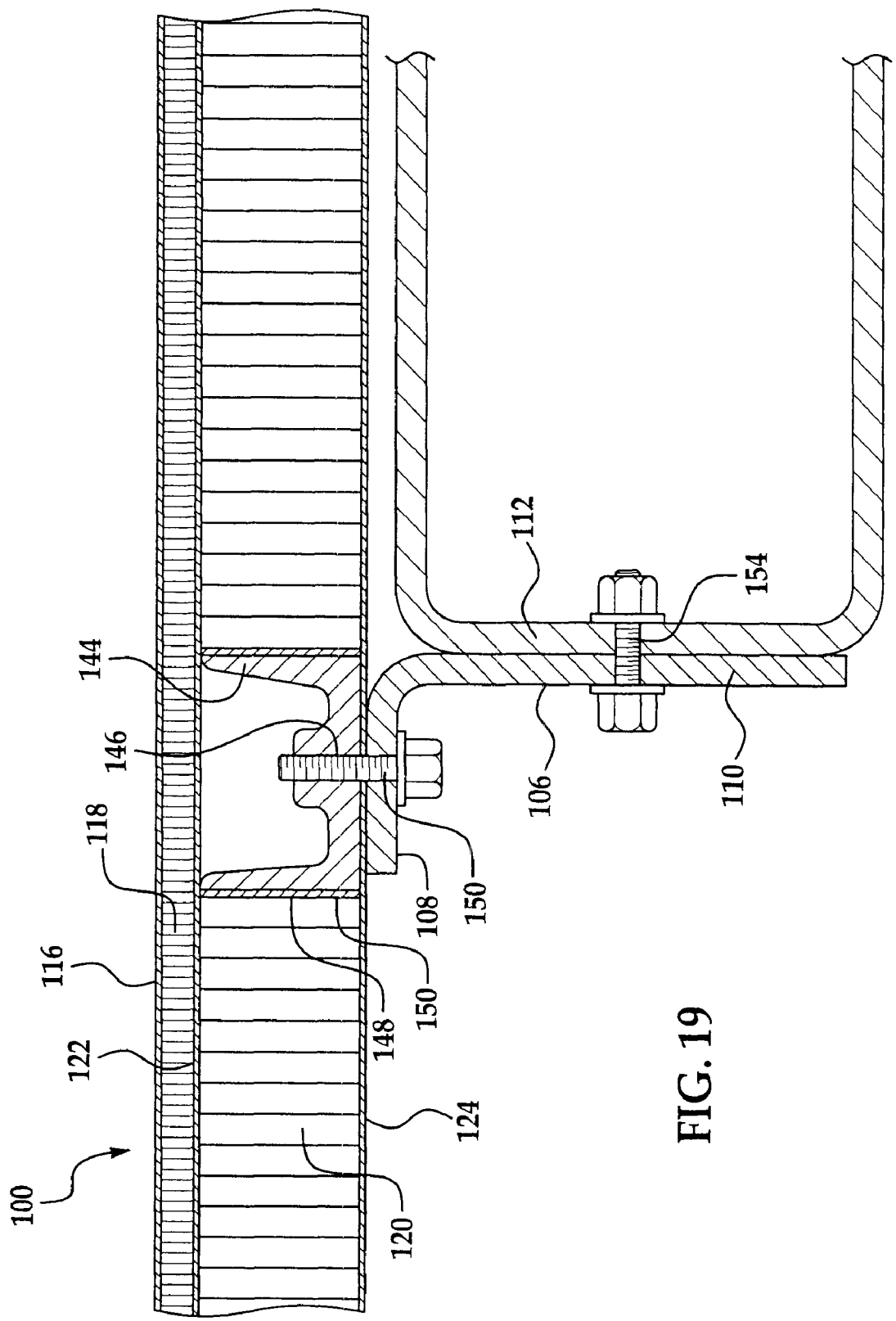
FIG. 19 is a partial cross-sectional view taken through line 19-19 of the floor section of FIG. 16.

FIG. 19 depicts a partial cross-sectional view through line 19-19 of the floor section 100 of FIG. 16. As shown in FIG. 19, this portion of the floor section 100 shown may again comprise a top-layer skin 116, a high-density first structural core 118 disposed directly beneath the top-layer skin 116, a low-density second structural core 120 affixed to the high-density first structural core 118 via a septum 122 and a bottom-layer skin 124. However, this portion of the floor section 100 may not have an attaching structure 126 extending through it. In order to attach a bracket 106 to the floor section 100, an insert 144 may have been inserted into a drilled hole 146 extending through the bottom layer skin 124 and through the lower density second structural core 120. The insert 144 may be bonded to the low density second structural core 120 and the bottom layer skin 124 using an adhesive 148.

The insert 144 may comprise a substantially U-shaped member made of a metal such as steel, titanium, or aluminum. In other embodiments, the insert 144 may be of varying types in varying shapes, sizes, configurations, orientations, and/or materials. The bracket 106 may have been attached to the insert 144 which is bonded to the floor section 100 through the use of a fastening member 150 extending through a hole 152 running through the floor attachment portion 108 of the bracket 106 through a surface of the insert 144. The fastening member 150 may comprise any type of fastening member such as a bolt, a nut, a snap-member, a tie, and/or any other type of fastening member known in the art.

One or more system components 112 may be attached to the system attachment portion 110 by using another fastening member 154 such as a bolt, a nut, a snap-member, a tie, adhesive, and/or any other type of fastening member known in the art. In such manner, system components 112 may be attached to the floor section 100 in areas away from an attaching structure 126 without the use of floor beams in the floor section 100 thereby saving cost and weight. The brackets 106 and system components 112 may be attached to the floor section 100 while the floor section 100 is located outside of an aircraft, and the integrated floor section 100 with the attached brackets 106 and system components 112 may then be installed into an aircraft.

Figure 20:
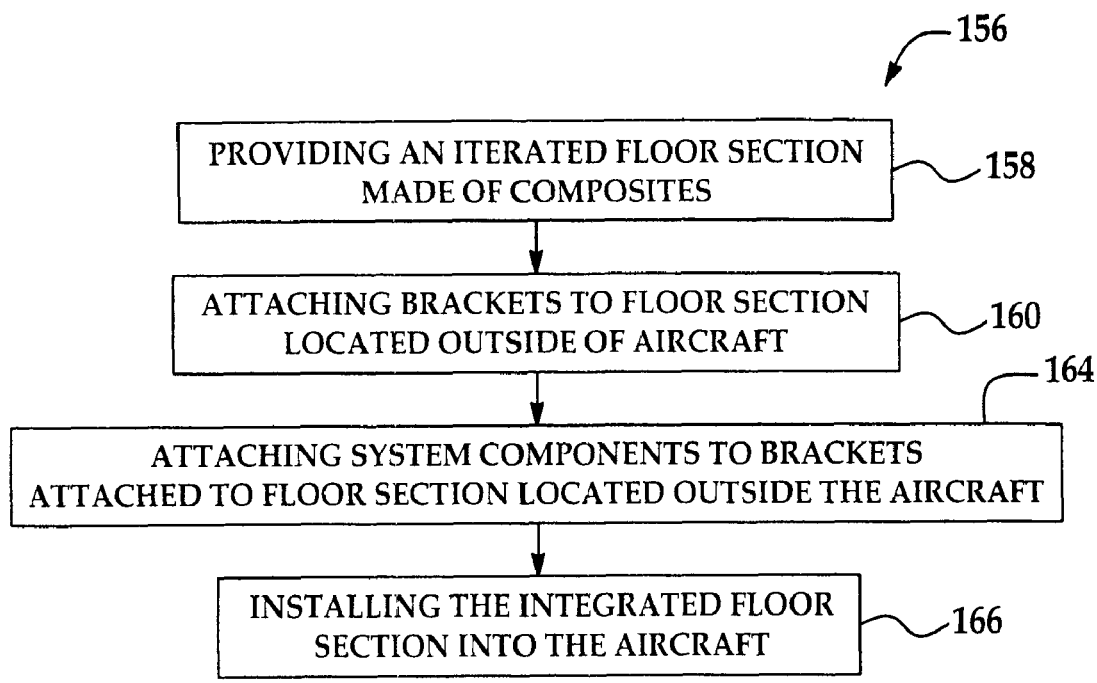
FIG. 20 is a flowing diagram showing the steps of one method of attaching system components to an integrated floor section.

FIG. 20 depicts one embodiment 156 of a method of attaching system components 112 and/or 114 to an integrated floor section 100 for use in an aircraft. In step 158, an integrated floor section 100 made of lightweight composite materials may be provided. The integrated floor section 100 may comprise a top-layer skin 116, a first structural core 118 disposed below the top-layer skin 116, a second structural core 120 disposed below the first structural core 118, and a bottom-layer skin 124 disposed below the second structural core 120. The first structural core 118 may be composed of a honeycomb material which is more dense than a honeycomb material from which the second structural core 120 is composed. The integrated floor section 100 may be monolithic, and may not contain any floor beams thereby saving weigh and costs. In other embodiments, the providing step 158 may additionally comprise one or more of: providing a tube 128 disposed within the second structural core 120; providing a first plank 130 disposed within the first structural core 118 above the hollow tube 128 and below the top-layer skin 116; and providing a second plank 132 disposed within the second structural core 120 below the hollow tube 128 and above the bottom-layer skin 124.

Figure 21:
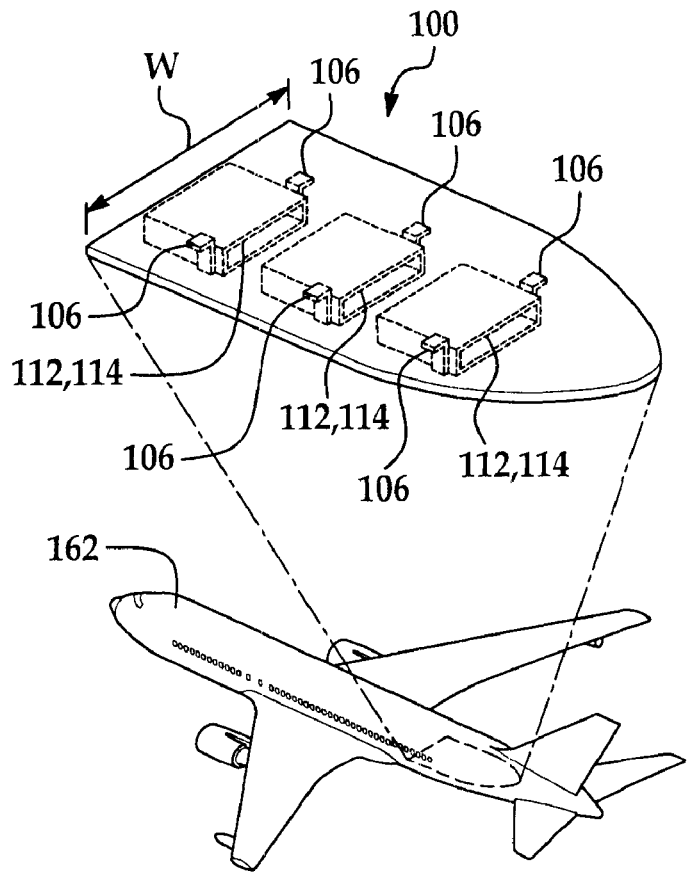
FIG. 21 is a perspective view of an integrated floor section disposed outside of an aircraft with brackets attached to the integrated section.

In step 160, a plurality of brackets 106 may be attached to the integrated floor section 100 while the floor section 100 is located outside of the aircraft. By attaching the brackets 106 to the floor section 100 while disposed outside of the aircraft, the floor section 100 may be more easily rotated and/or moved into varying positions for ease of installation. FIG. 21 shows a perspective view of an integrated floor section 100 disposed outside of an aircraft 162 with brackets 106 attached to the integrated section 100. In one embodiment, as shown in FIG. 18, in a situation where the brackets 106 are attached near an attaching structure 126, step 160 (FIG. 20) may comprise attaching at least some of the brackets 106 to the hollow tube 128 using a fastening member 136 extending through the second plank 132 and a bottom surface 140 of the hollow tube 128.

In another embodiment, as shown in FIG. 19, in a situation where the brackets 106 are attached away from an attaching structure 126, step 160 may comprise attaching at least some of the brackets 106 to the second structural core 120 by bonding inserts 144 to the second structural core 120 and fastening the brackets 106 to the bonded inserts 144. Step 160 may further comprise attaching brackets 106, which are lightweight and which only extend over a small portion of the floor section 100, to the floor section 100 while the floor section 100 is located outside of the aircraft 162.

In step 164, system components 112 and/or 114 may be attached to the plurality of brackets 106 attached to the integrated floor section 100 while the floor section 100 is located outside of the aircraft 162. By attaching the system components 112 and/or 114 to the brackets 106 of the floor section 100 while disposed outside of the aircraft, the floor section 100 may be more easily rotated and/or moved into varying positions, as required for the specific system component being installed, for ease of installation. Again, FIG. 21 shows a perspective view of the integrated floor section 100 disposed outside of the aircraft 162 with system components 112 and/or 114 attached to the integrated section. In one embodiment, step 164 may comprise attaching one or more system components 112 and/or 114 to the brackets 106 attached to the integrated floor section 100 while the floor section 100 is located outside of the aircraft 162, wherein the one or more system components 112 and/or 114 may comprise at least one of a seat, a duct, an electrical system, an electrical box, a control system, a lighting system, an entertainment system, carpeting, a seat track, a cable, a housing, a wire, and/or another type of system component.

In step 166, the integrated floor section 100 may be installed into the aircraft 162 with the brackets 106 and the system components 112 and/or 114 attached to the floor section 100. Referring to FIG. 7, the floor section 100 is positioned in a vertical orientation 61 as it is moved into the end of the fuselage 60. The floor section 100 is subsequently rotated into a horizontal orientation 63 within the fuselage 60. The width W of the floor section 100 may be less than a height 65 of the aircraft 58 but only marginally less than the width 73 of the aircraft 58. In this case, the one-piece, monolithic, integrated floor section 100 having the attached brackets 106 and system components 112 and/or 114 may be installed into the aircraft 58 by moving the floor section 100 in a vertical position 61 into the aircraft 58, and then rotating the floor section 100 into a horizontal position 63 within the aircraft 58. The floor section 100 may subsequently be attached to interior walls 69 of the aircraft 58, using fastening mechanisms known in the art, to permanently fix the floor section 100 in a horizontal position 63 within the aircraft 58.

In one embodiment, only one monolithic, integrated floor section 100 may be installed into the aircraft 58. In other embodiments, a low number of integrated floor sections 100 may be installed into the aircraft 58, such as one, two, or three integrated floor sections 100, in aligned, end-to-end relationship along the length of the aircraft 58.

Building a monolithic, integrated floor section 100 outside of the aircraft 162 which includes system components 112 and 114 may save time and manufacturing costs because it may be easier to install the system components 112 and 114. The materials and structure of the floor section 100 of the disclosure, along with the use of the attached brackets 106, may allow for a monolithic, integrated floor section 100 which is strong and durable enough to obviate the need for floor beams thereby saving weight and cost. The strong and durable nature of the floor section 100 may reduce maintenance costs once installed into the aircraft 162, because the floor section 100 may be less likely to be damaged. The disclosure may allow aircraft to be built which weigh less, cost less to manufacture, cost less to maintain, use less fuel, operate more efficiently, can be fabricated with less time and difficulty, and/or with more cargo space.

Figure 22:
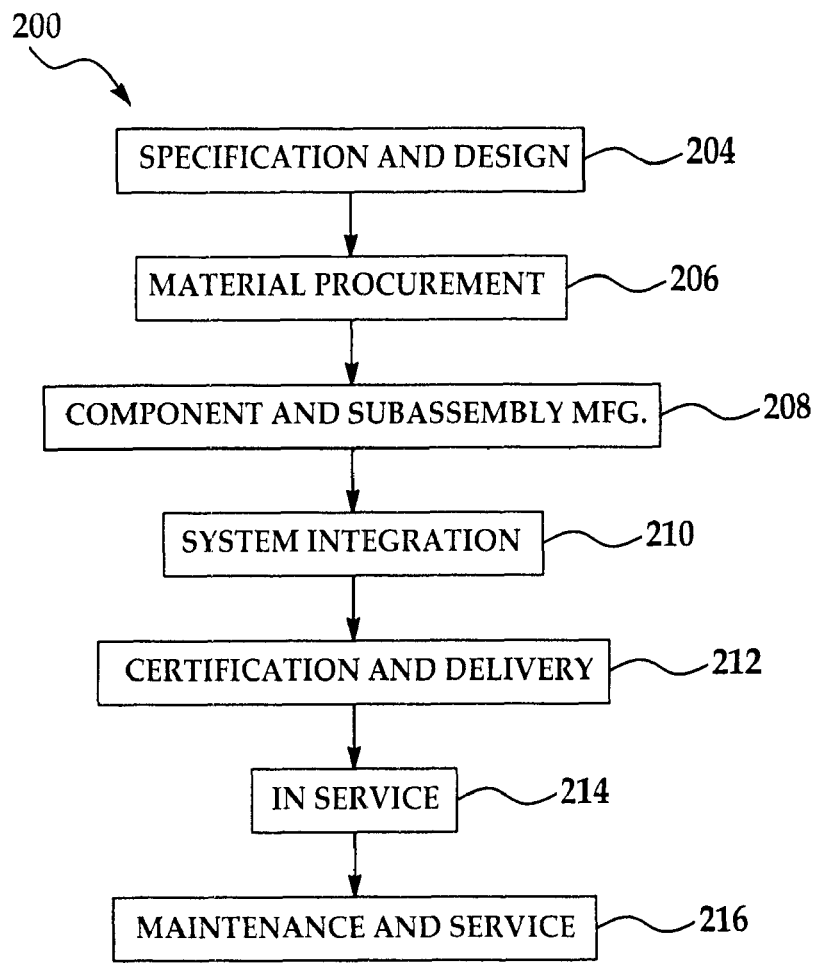
FIG. 22 is a flow diagram of aircraft production and service methodology.
Figure 23:
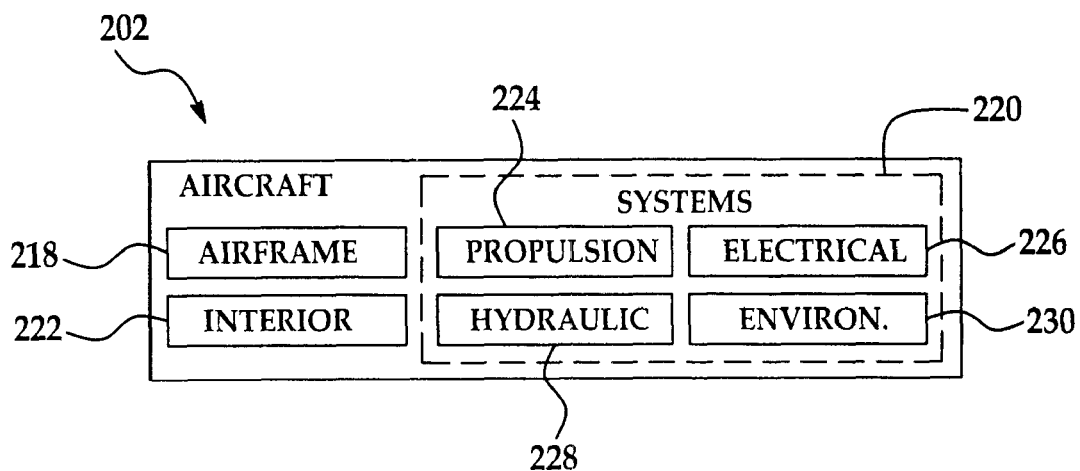
FIG. 23 is a block diagram of an aircraft.

Embodiments of the disclosure may find use in a variety of potential applications, particularly in the transportation industry, including for example, aerospace, marine and automotive applications. Thus, referring now to FIGS. 22 and 23, embodiments of the disclosure may be used in the context of an aircraft manufacturing and service method 200 as shown in FIG. 22 and an aircraft 202 as shown in FIG. 23. During pre-production, exemplary method 200 may include specification and design 204 of the aircraft 202 and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 23, the aircraft 202 produced by exemplary method 200 may include an airframe 218 with a plurality of systems 220 and an interior 222. Examples of high-level systems 220 include one or more of a propulsion system 224, an electrical system 226, a hydraulic system 228, and an environmental system 230. Any number of other systems may be included. Although an aerospace example is shown, the principles of the disclosure may be applied to other industries, such as the marine and automotive industries.

Systems and methods embodied herein may be employed during any one or more of the stages of the production and service method 200. For example, components or subassemblies corresponding to production process 200 may be fabricated or manufactured in a manner similar to components or subassemblies produced while the aircraft 92 is in service. Also, one or more apparatus embodiments, method embodiments, or a combination thereof may be utilized during the production stages 208 and 210, for example, by substantially expediting assembly of or reducing the cost of an aircraft 202. Similarly, one or more of apparatus embodiments, method embodiments, or a combination thereof may be utilized while the aircraft 202 is in service, for example and without limitation, to maintenance, repair of composite structure, and service 216.

It should be understood, of course, that the foregoing relates to exemplary embodiments of the invention and that modifications may be made without departing from the spirit and scope of the invention as set forth in the following claims.

What is claimed is:

1. A method of assembling an aircraft, comprising:
    forming a stand-alone floor section having a span extending substantially across the width of the aircraft's fuselage by laminating a first higher density structural core and second lower density structural core between top-layer and bottom layer skins with a septum therebetween, including placing the first structural core next to the top-layer skin, placing the septum beneath the first structural core and placing the second structural core beneath the septum and next to the bottom-layer skin;
    embedding a hollow tubular mounting structure in at least one of the cores of said floor section;
    preassembling a subassembly outside of the aircraft by attaching at least one aircraft system component to the floor section; said attaching the at least one aircraft system component includes using an attaching structure to attach the at least one aircraft system component to the mounting structure;
    moving the subassembly into the fuselage of the aircraft; and
    installing the subassembly into the fuselage.

2. The aircraft assembly method of claim 1, wherein preassembling the subassembly is performed at a workstation outside the fuselage.

3. The aircraft assembly method of claim 1, wherein attaching at least one aircraft system component to the floor section comprises attaching at least one of a seat, a duct, an electrical system, an electrical box, electrical wiring, a control system, a lighting system, an entertainment system, carpeting, a seat track, a cable, a housing, a flight control, and a panel.

4. The aircraft assembly method of claim 1, wherein laminating the first higher density structural core and second lower density structural core comprises laminating a first core having a density approximately 3 to 5 times greater than a density of the second core.

5. The aircraft assembly method of claim 1, wherein laminating the first higher density structural core comprises laminating a core having a thickness of approximately 0.1 inches and a density in the range of approximately 3 pounds per cubic foot to 10 pounds per cubic foot, and laminating the second lower density structural core comprises laminating a core having a thickness of approximately 0.4 inches and a density in the range of approximately 2 pounds per cubic foot to 3 pounds per cubic foot, and wherein the first and second cores comprise at least one of Nomex® and Kevlar®.

6. The aircraft assembly method of claim 1, wherein laminating the first and second structural cores between top-layer and bottom layer skins comprises laminating a top-layer skin having a thickness in a range of approximately 0.03 inches to 0.08 inches, and a bottom-layer skin having a thickness in a range of approximately 0.02 inches to 0.08 inches, and at least one of the top-layer and bottom-layer sheets comprises at least one of a titanium foil sheet, a titanium-CFRP laminate, a fiberglass laminate, a carbon-fiber reinforced plastic sheet, a thermoplastic sheet, and a thermoplastic resin.

7. The aircraft assembly method of claim 1, wherein placing the septum beneath the first structural core comprises placing a septum having a thickness in the range of approximately 0.005 inches to 0.03 inches, the septum comprising at least one of: a titanium foil sheet, a titanium-CFRP laminate, a fiberglass laminate, a carbon-fiber reinforced plastic sheet, a thermoplastic sheet, and, a thermoplastic resin.

8. The aircraft assembly method of claim 1, wherein embedding the hollow tubular mounting structure in at least one of the cores comprises embedding a hollow tubular mounting structure having a plurality of through holes therein respectively representing a plurality of locations at which the aircraft system component may be attached.

9. The aircraft assembly method of claim 1, wherein using an attaching structure to attach the at least one aircraft system component to the mounting structure comprises using a bracket for attaching the aircraft system component to the bottom of the floor section.

10. The aircraft assembly method of claim 1, further comprising attaching a first carbon plank along a length of the floor section above the hollow tubular mounting structure, the first carbon plank having a width greater than a width of the hollow tubular mounting structure.

11. The aircraft assembly method of claim 10, further comprising attaching a second carbon plank along a length of the floor section below the hollow tubular mounting structure.

* * * * *